March 9, 1943.     H. P. PHILLIPS     2,313,396

PISTON EXPANDER

Filed March 2, 1942

INVENTOR.
Harold P. Phillips
BY
Earl D. Chappell

Patented Mar. 9, 1943

2,313,396

UNITED STATES PATENT OFFICE 2,313,396

PISTON EXPANDER

Harold P. Phillips, Hastings, Mich., assignor to Hastings Manufacturing Company, Hastings, Mich.

Application March 2, 1942, Serial No. 432,987

3 Claims. (Cl. 309—12)

This invention relates to improvements in piston expanders.

The main objects of this invention are:

First, to provide a piston expander which is well adapted for pistons having non-split piston skirts and is very effective when used in cast iron and steel pistons, although desirable for use in other types.

Second, to provide a piston expander which may be quickly assembled within a piston by driving into position and at the same time is very securely retained.

Objects pertaining to details and economies of the invention will definitely appear from the description to follow. The invention is defined in the claims.

A structure which embodies the features of this invention is clearly illustrated in the accompanying drawing, in which.

In the accompanying drawing 1 represents an internal combustion engine piston of non-split type, 2 the internal piston pin bosses thereof, and 3 the piston pin. The expander of my invention comprises a U-shaped spring member 4 of spring steel having outwardly diverging arms 5 terminating in piston wall engaging feet or members 6 of substantial arc and transverse curvature. These arms are of substantial width and it will be noted that the piston wall engaging members engage the piston wall at substantially spaced points, the object being to expand the piston skirt substantially throughout the length thereof rather than provide for spot expansion.

Figure 1:
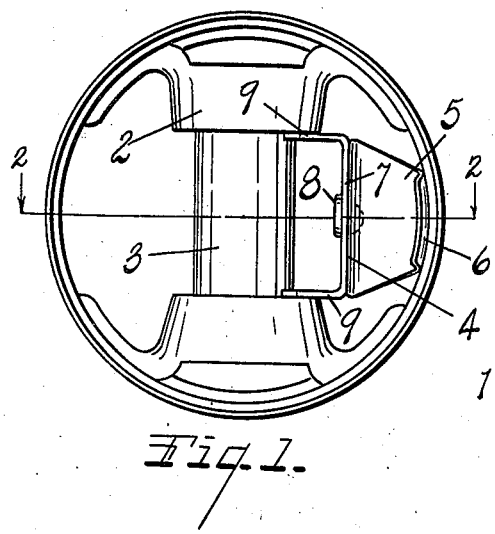
Fig. 1 is an inverted view of a piston with one of my piston expanders in assembled relation therein, the piston pin constituting the supporting abutment member.
Figure 2:
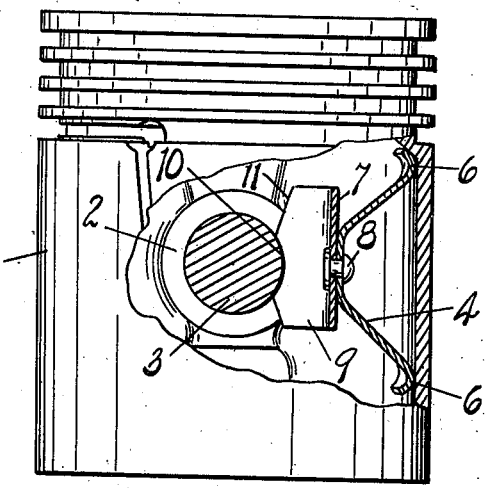
Fig. 2 is a fragmentary enlarged side elevation partially in longitudinal section on line 2—2 of Fig. 1.
Figure 3:
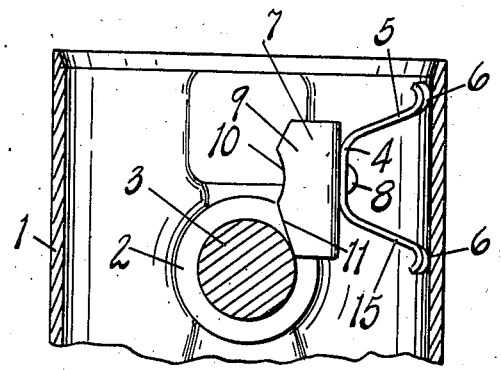
Fig. 3 is a fragmentary longitudinal section illustrating one of the steps in assembling an expander within the piston.

The expander member 4 is carried by the supporting yoke 7 which is preferably a sheet metal stamping, the yoke being disposed to face inwardly, or being arranged back to back relative to the expander member 4. The expander member is secured to the yoke by means of the rivet 8. The arms 9 of the yoke have curved abutment engaging seats 10 of substantial depth. In the embodiment of Figs. 1, 2 and 3 the piston pin constitutes the abutment. In the embodiment shown in Figs. 4 and 5 the piston pin bosses constitute the abutment. In the embodiment where the piston pin constitutes the abutment the arms of the yoke fit between the bosses. The inner edges of the arms of the yoke are beveled or inclined at 11 from the upper edges of the seats 10 to the upper edges of the arms, thus providing a long beveled or wedging surface which greatly facilitates the expander being driven into a piston to engage the seats thereof with supporting abutment members within the piston and placing of the arms of the spring member in stress engagement with the wall of the piston. The transverse curvature of the piston wall engaging feet or portions 6 also facilitates this action, as they may slip along the wall without distorting or placing the arms of the expander member under undue stresses.

The cylinder engaging surfaces, being of substantial area, prevent undesirable breathing action which results from certain expanders when used in thin-walled pistons, particularly steel and cast iron, as the piston is reciprocated in worn cylinders where the diameter varies substantially during the stroke of the piston, that is, there is a snubbing action which tends quite effectively to prevent the expansion and contraction of the piston with each stroke.

Figure 4:
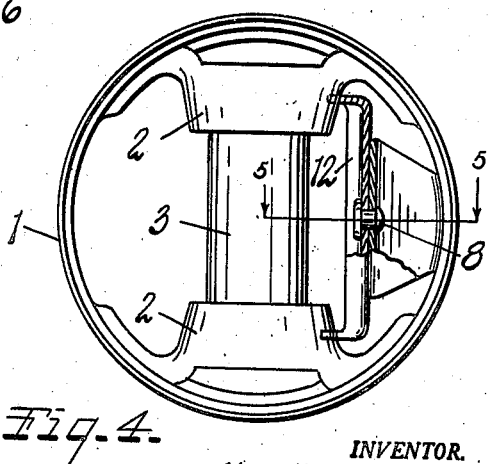
Fig. 4 is an inverted view of a piston with a modified form of my expander partially in section and partially broken away.
Figure 5:
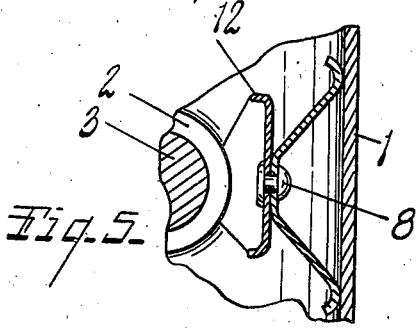
Fig. 5 is a fragmentary section on line 5—5 of Fig. 4.

In the embodiment shown in Figs. 4 and 5 the yoke member is provided with longitudinal edge flanges 12, the reason for this being that the yoke is substantially longer in this embodiment than that of the embodiment of Figs. 1 to 3, and it is not intended that the yoke in itself shall spring or yield, its function being to support the expander spring member and facilitate the assembly of the expander within a piston.

I have illustrated and described my invention in practical adaptations for installations where the piston pin may be used as an abutment member, and where the piston pin bosses may be used as abutment members. I have not attempted to illustrate or describe certain modifications or adaptations which might be desirable for pistons of particular manufacturers as it is believed this disclosure will enable those skilled in the art to embody or adapt my invention as may be desired.

Having thus described my invention what I claim as new and desire to secure by Letters Patent is:

1. A piston expander comprising a U-shaped spring member having outwardly diverging and outwardly tapering arms terminating in curved piston wall engaging members of substantial curcumferentially arc concentric to the piston wall curvature and of transverse curvature at an angle to said arc, and a supporting yoke disposed back to back in 90-degree angular relation to said spring member and rigidly riveted in non-movable relation thereto, the inwardly facing edges of the arms of said supporting yoke having curved abutment engaging seats of substantial depth therein, the said inner edges being inclined from the upper edges of the seats to the edges of the arms to facilitate the expander being driven into a piston to engage the seats thereof with supporting abutment members within the piston and the arms of the spring member in stress engagement with the wall of the piston at substantially vertically spaced points thereof.

2. A piston expander comprising a U-shaped spring member having outwardly diverging arms terminating in curved piston wall engaging members of substantial arc concentric to the piston wall curvature, and a supporting yoke disposed back to back for supporting relation to said spring member and fixedly secured thereto, the inwardly facing edges of the arms of said supporting yoke having curved abutment engaging seats of substantial depth therein, the said inner edges being inclined from the upper edges of the seats to the edges of the arms to facilitate the expander being driven into a piston to engage the seats thereof with supporting abutment members within the piston and the arms of the spring member in stress engagement with the wall of the piston at substantially vertically spaced points thereof, the degree of curvature of said wall engaging members of said arms being such that they present curved surfaces during the installing of the expander and after it is installed.

3. A piston expander comprising a U-shaped spring member having outwardly diverging arms terminating in curved piston wall engaging members, and a supporting yoke disposed back to back in angular relation relative to said spring member and permanently secured in rigid non-movable relation thereto, the inwardly facing edges of the arms of said supporting yoke having abutment engaging seats of substantial depth therein, the said inner edges having relatively long beveled portions extending from the upper edges of the seats to facilitate the expanders being driven into a piston to engage the seats thereof with supporting abutment members within the piston and the arms of the spring member in stress engagement with the wall.

HAROLD P. PHILLIPS.